United States Patent Office 3,682,898
Patented Aug. 8, 1972

---

3,682,898
17-OXYGENATED 7α-METHYL-2,3-EPITHIO-5α-ANDROSTANES
Paul D. Klimstra, Northbrook, Ill., assignor to G. D. Searle & Co., Chicago, Ill.
No Drawing. Filed Aug. 13, 1969, Ser. No. 849,872
Int. Cl. C07c *173/00*
U.S. Cl. 260—239.5                        2 Claims

ABSTRACT OF THE DISCLOSURE

Anabolic and androgenic 17-oxygenated-7α-methyl-2,3-epithio-5α-androstanes lacking potent anti-estrogenic side-effects are produced by reaction of the corresponding 2,3-epoxy compounds with hydrothiocyanic acid followed by cyclization of the 2/3-hydroxy/thiocyano intermediates.

---

The present invention is concerned with novel steroidal derivatives of the androstane family containing a 2,3-epithio and a 7α-methyl substituent and, more particularly, with 17-oxygenated 7α-methyl-2,3-epithio-5α-androstanes represented by the following structural formula

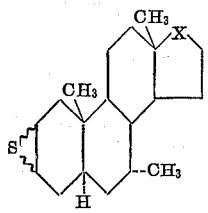

wherein the wavy lines denote the alternative α or β stereochemical configuration and X is a carbonyl radical or a radical of the formula

in which formula, Y is hydrogen or an aliphatic or cycloaliphatic acyl radical containing not more than 12 carbon atoms.

The aliphatic and cycloaliphatic acyl radicals containing not more than 12 carbon atoms are exemplified by formyl, acetyl, propionyl, butyryl, cyclopentylpropionyl, cyclohexylbutyryl, etc.

2,3-epoxy-7α-methyl-5α-androstanes represented by the following structural formula

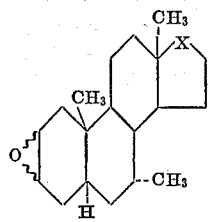

wherein X and the wavy lines have the identical meanings as hereinbefore indicated, serve as suitable starting materials for the manufacture of the compounds of this invention.

The β-epoxides are produced by a 2-step process involving conversion of the Δ² starting materials to 3α,2β-bromohydrins followed by cyclization of the latter materials. As a specific example, 7α-methyl-5α-androst-2-en-17-one is contacted with N-bromosuccinimide and aqueous perchloric acid in dioxane to yield 3α-bromo-2β-hydroxy-7α-methyl-5α-androstan-17-one. The latter bromohydrin is heated with aqueous potassium carbonate, thus affording 2β,3β-epoxy-7α-methyl-5α-androstan-17-one.

The α-epoxides are produced directly from the Δ² starting materials by reaction with a peracid. Typically, 7α-methyl-5α-androst-2-en-17-one in chloroform is allowed to react with meta-chloroperbenzoic acid, thus resulting in 2α,3α-epoxy-7α-methyl-5α-androstan-17-one.

Reaction of the aforementioned 2,3-epoxides with hydrothiocyanic acid produces the novel intermediate 2/3-hydroxy/thiocyano substances. In the case of the 2β,3β-epoxy materials, the products possess a 2β-hydroxy and a 3α-thiocyano substituent, while, in the case of the 2α,3α-epoxides, the 2β-thiocyano-3α-hydroxy intermediates are obtained. Specific examples of that process are the reactions of 2β,3β-epoxy-7α-methyl-5α-androstan-17-one or 2α,3α-epoxy-7α-methyl-5α-androstan-17-one with ethereal hydrothiocyanic acid to afford 2β-hydroxy-7α-methyl-3α-thiocyano-5α-androstan-17-one and 3α-hydroxy-7α-methyl-2β-thiocyano-5α-androstan-17-one, respectively.

Cyclization of the hydroxy/thiocyano intermediates is effected by reaction with an inorganic alkaline reagent such as sodium hydroxide, potassium hydroxide, lithium hydroxide, sodium carbonate or potassium carbonate, dissolved in a suitable solvent medium at or near room temperature. A specific illustration of that process is the reaction of 2β-hydroxy-7α-methyl-3α-thiocyano-5α-androstan-17-one with potassium hydroxide in aqueous methanol to yield 2α,3α-epithio-7α-methyl-5α-androstan-17-one.

The aliphatic and cycloaliphatic acyl derivatives of this invention are conveniently produced by reaction of the parent 17β-hydroxy substances with the appropriate anhydride or halide, preferably in the presence of a suitable acid acceptor such as pyridine or triethylamine. Typical of that procedure is the reaction of 2α,3α-epithio-7α-methyl-5α-androstan-17β-ol in pyridine with 3-cyclopentylpropionyl chloride to yield 2α,3α-epithio-7α-methyl-5α-androstan-17β-ol 3-cyclopentylpropionate.

The compounds of this invention are useful as a result of their valuable pharmacological properties. They possess, for example, hormonal activity as is evidenced by their anabolic and androgenic potency. They possess the further advantage of lacking potent antiestrogenic side-effects.

The pharmacological activity of the novel compounds of this invention is specifically illustrated by the anabolic and androgenic activity of 2α,3α-epithio-7α-methyl-5α-androstan-17β-ol, 2β,3β - epithio-7α-methyl-5α-androstan-17β-ol and 2α,3α-epithio-7α-methyl-5α-androstan-17β-ol acetate when tested in the assay originally described by Eisenberg and Gordon, J. Pharm. Exp. Therap., 99, 38 (1950) as modified by Saunders and Drill, Proc. Soc. Exper. Biol. and Med., 94, 646 (1957). That assay is described as follows:

Corn oil solutions or suspensions of the test compound are administered intramuscularly or intragastrically, daily for a period of 7 days, to a group of castrated immature male rats. An initial dose of 5 mg. intramuscularly or 15 mg. intragastrically is normally employed. On the day after the last injection the animals are sacrificed and the seminal vesicles, ventral prostate glands and levator ani muscles are removed, dissected free of extraneous tissue and weighed. Those weights are compared with the corresponding weights or organs taken from control animals, treated in the same manner save for omission of the test compound. The increases in weights of the seminal vesicles and ventral prostate glands are used as a measure of androgenicity and increases in levator ani muscle weight serve as an index of anabolic activity. A compound is rated active if it produces an increase in organ weight statistically significant at a probability level of less than 0.01.

The invention will appear more fully from the examples which follow. These examples are set forth by way of illustration only and it will be understood that the invention is not to be construed as limited thereby either in spirit or in scope as many modifications both in materials and methods will be apparent from this disclosure to those skilled in the art. In these examples temperatures are given in degrees centigrade (0° C.). Quantities of materials are expressed in parts by weight unless otherwise noted.

EXAMPLE 1

To a solution of 3 parts of 7α-methyl-5α-androst-2-en-17-one in 100 parts of dioxane, cooled to 0–5°, is added with stirring a mixture containing 1.6 parts of 60% aqueous perchloric acid, 25 parts of water and 2.7 parts of N-bromosuccinimide. The addition requires about 5 minutes. The initial colorless mixture gradually turns yellow. After 40 minutes of reaction time, excess aqueous sodium hydrosulfite is added in order to decolorize the mixture. At that point the mixture is diluted with water to the point of turbidity, then is allowed to cool at 0–5° in order to induce crystallization. The resulting crystals are collected by filtration. Additional material is obtained by dilution of the filtrate with water. Recrystallization of the crude product from methanol affords pure 3α-bromo-2β-hydroxy-7α-methyl-5α-androstan-17-one, melting with decomposition at about 203–205°. This compound is characterized further by an optical rotation, in chloroform, of +29°.

EXAMPLE 2

To a solution of 1.8 parts of 3α-bromo-2β-hydroxy-7α-methyl-5α-androstan-17-one in 50 parts of dimethylformamide is added carefully and slowly a solution consisting of 0.72 part of potassium carbonate dissolved in 6 parts of water. The resulting reaction mixture is heated at steam bath temperature for about 2½ hours, at the end of which time it is diluted with water to the point of turbidity. That diluted mixture is cooled and the resulting crystalline product is collected by filtration, thus affording white needle-like crystals of pure 2β,3β-epoxy-7α-methyl-5α-androstan-17-one, melting at about 147–150°. This compound exhibits an optical rotation of +83.5° in chloroform.

EXAMPLE 3

To a solution of 2 parts of 7α-methyl-5α-androst-2-en-17-one in 67 parts of chloroform, cooled to 0–5°, is added a solution of 1.6 parts of meta-chloroperbenzoic acid dissolved in 22 parts of chloroform. Cooling at that temperature is continued for about 10 minutes, at the end of which time the mixture is allowed to warm to room temperature and kept there for about 1 hour longer. At that time 3 parts of calcium hydroxide is added and the mixture is stirred for about 30 minutes. Filtration of the mixture at that point affords a filtrate, which is stripped of solvent under reduced pressure, thus yielding an oily residue. That residue solidifies upon standing and the resulting crude product is purified by recrystallization from methanol, in that manner affording 2α,3α-epoxy-7α-methyl-5α-androstan-17-one, melting at about 143–145°.

EXAMPLE 4

To a cold solution of 10 parts of potassium thiocyanate in 6 parts of water is added 28 parts of ether and the mixture is shaken while 15 parts of 85% phosphoric acid is added in small portions. The purple ether layer is separated and washed with water, then dried over anhydrous sodium sulfate. To that ethereal solution is then added 1 part of 2β,3β-epoxy-7α-methyl-5α-androstan-17-one and the resulting reaction mixture is allowed to stand at room temperature for about 30 minutes. At the end of that reaction period anhydrous potassium carbonate is added and the mixture is stirred in order to destroy the excess hydrothiocyanic acid. Decantation of the mixture affords a solution, which is stirpped of solvent in a nitrogen atmosphere. The resulting solid product is recrystallized from methanol containing a small amount of water to afford 2β-hydroxy-7α-methyl-3α-thiocyano-5α-androstan-17-one, melting with decomposition at about 232–235°.

EXAMPLE 5

To a solution of 1.7 parts of 2α,3α-epoxy-7α-methyl-5α-androstan-17-one in 70 parts of ether is added 75 parts by volume of an ethereal hydrothiocyanic acid solution, prepared as in Example 4, from 5 parts of potassium thiocyanate, 22 parts of phosphoric acid and 9 parts of water. The resulting reaction mixture is stirred for about 40 minutes, then is treated with 25 parts of solid potassium carbonate and stirred for an additional 30 minutes. At the end of that time, decolorizing carbon is added and the mixture is filtered through diatomaceous earth. Evaporation of the filtrate under reduced pressured affords the product, i.e. 3α-hydroxy - 7α - methyl-2β-thiocyano-5α-androstan-17-one, as an oil. This compound exhibits an optical rotation, in chloroform, of 95.5°.

EXAMPLE 6

To a solution of 1.5 parts of 2β-hydroxy-7α-methyl-3α-thiocyano-5α-androstan-17-one in 45 parts of tetrahydrofuran is added, with stirring and cooling at 0–5°, a solution of 4 parts of lithium tri-(tertiary-butoxy) aluminum hydride in 45 parts of tetrahydrofuran. The resulting reaction mixture is stirred at room temperature for about 1 hour, then is poured carefully into a mixture of ice and 10% aqueous acetic acid. The resulting precipitated product is collected by filtration, washed with water and dried in air to afford the crude product. Recrystallization of that material from tetrahydrofuran produces small needle-like crystals of 7α-methyl-3α-thiocyano-5α-androstane-2β,17β-diol, melting at about 193–195°. This compound displays an optical rotation, in chloroform, of +8°.

EXAMPLE 7

A mixture consisting of 0.3 part of 2β-hydroxy-7α-methyl-3α-thiocyano-5α-androstan - 17 - one and 6.4 parts of methanol is warmed slightly and a solution of 0.1 part of potassium hydroxide in 0.5 part of water is added. The resulting mixture is stirred until homogeneous, then is allowed to stand at room temperature for about 30 minutes. Dilution of that reaction mixture with water followed by cooling a 0–5° results in precipitation of the product, i.e. 2α,3α - epithio-7α-methyl-5α-androstan-17-one. This compound melts at about 137–139° and is characterized further by the following structural formula

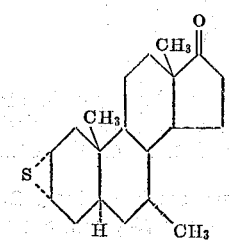

EXAMPLE 8

To a mixture of 1.6 parts of 3α-hydroxy-7α-methyl-2β-thiocyano-5α-androstan-17-one with 24 parts of methanol is added a solution of 0.4 part of potassium hydroxide in 1 part of water. The resulting homogeneous mixture is allowed to stand at room temperature for about 30 minutes, at the end of which time it is diluted with water and cooled to 0–5°. The product which separates is collected by filtration, washed with water, dried in air, then purified by recrystallization from aqueous acetone, thus affording 2β,3β-epithio-7α-methyl-5α-androstan - 17 - one, melting at about 139–141°. This compound is characterized by the following structural formula

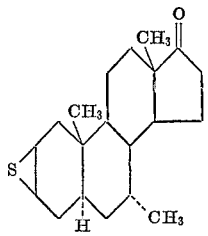

EXAMPLE 9

To a mixture of 1.2 parts of 7α-methyl-3α-thiocyano-5α-androstane-2β,17β-diol with 24 parts of methanol is added a solution of 0.3 part of potassium hydroxide in 1 part of water. The resulting reaction mixture is allowed to stand at room temperature for about 10 minutes, at which time the formation of needle-like crystals is noted. That mixture is then cooled at 0–5° in order to effect completion of crystallization and the resulting crystals are collected by filtration, then recrystallized from aqueous methanol to yield 2α,3α-epithio-7α-methyl-5α-androstan-17β-ol, melting at about 142–143.5°. This compound exhibits an optical rotation, in chloroform, of —14° and is represented by the following structural formula

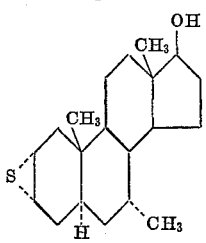

EXAMPLE 10

A mixture containing 0.35 part of 2α,3α-epithio-7α-methyl-5α-androstan-17β-ol, 1.3 parts of acetic anhydride and 2.6 parts of pyridine is stored at room temperature for about 16 hours, then is diluted successively with methanol and water. Cooling of the diluted mixture results in formation of needle-like crystals, which are separated by filtration and dried, thus affording 2α,3α-epithio-7α-methyl-5α-androstan-17β-ol 17-acetate, melting at about 174–176°. This compound exhibits an optical rotation, in chloroform, of —4.5° and is represented by the following structural formula

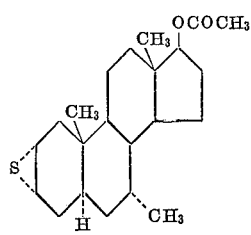

EXAMPLE 11

To a solution of 0.5 part of 2α,3α-epithio-7α-methyl-5α-androstan-17β-ol in 5 parts of pyridine is added, with cooling at 0–5° and stirring, 0.3 part by volume of 3-cyclopentyl propionyl chloride over a period of about 5 minutes. The resulting reaction mixture is stirred at 0–5° for about 10 minutes, then is allowed to warm to room temperature and stirred for an additional 10 minutes. Dilution of that mixture with methanol and water followed by cooling results in precipitation of the crude product, which is isolated by filtration and washed with water. Recrystallization of that material from acetone affords pure 2α,3α-epithio-7α-methyl-5α-androstan-17β-ol 3-cyclopentylpropionate, melting at about 142–145°. It displays an optical rotation, in chloroform, of —10° and is further characterized by the following structural formula

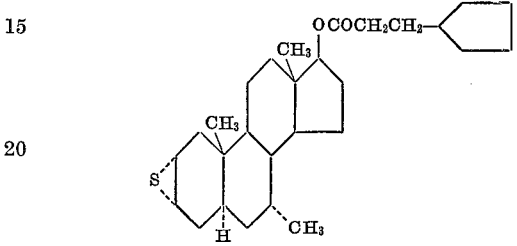

EXAMPLE 12

A mixture consisting of 0.5 part of 2β,3β-epithio-7α-methyl-5α-androstan-17-one, 1.25 parts of lithium tri-(tertiary-butoxy) aluminum hydride and 18 parts of tetrahydrofuran is stirred with cooling at 0–5° for about 100 minutes, then is poured carefully into a mixture of ice and 10% aqueous acetic acid. The resulting precipitated product is collected by filtration, washed with water and dried in air. Purification of the resulting crude product by recrystallization from aqeuous methanol affords 2β,3β-epithio-7α-methyl-5α-androstan-17β-ol. This compound is characterized by an optical rotation, in chloroform, of +11° and also by the following structural formula

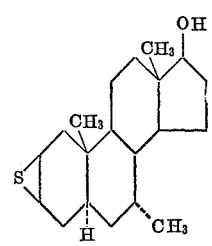

EXAMPLE 13

The substitution of an equivalent quantity of propionic anhydride in the procedure of Example 10 results in 2α,3α-epithio-7α-methyl-5α-androstan-17β-ol 17-propionate.

EXAMPLE 14

When an equivalent quantity of 4-cyclohexylbutyryl chloride is substituted in the procedure of Example 11, there is produced 2α,3α-epithio-7α-methyl-5α-androstan-17β-ol 4-cyclohexylbutyrate.

What is claimed is:
1. 2β,3β-epithio-7α-methyl-5α-androstan-17-one.
2. 2β,3β-epithio-7α-methyl-5α-androstan-17β-ol.

References Cited
UNITED STATES PATENTS 3,230,215   1/1966   Komeno _____ 260—239.5
3,519,715   7/1970   Nagata et al. _____ 424—241

LEWIS GOTTS, Primary Examiner
E. G. LOVE, Assistant Examiner

U.S. Cl. X.R.

260—239.55 R, 397.4; 424—241